Aug. 12, 1947. J. B. PARSONS 2,425,391
HYDRAULIC REGULATOR MECHANISM FOR VEHICLE WINDOWS OR THE LIKE
Filed July 3, 1944 3 Sheets-Sheet 1

INVENTOR.
John B. Parsons
BY
Malcolm W. Fraser
ATTORNEY

Aug. 12, 1947.  J. B. PARSONS  2,425,391
HYDRAULIC REGULATOR MECHANISM FOR VEHICLE WINDOWS OR THE LIKE
Filed July 3, 1944  3 Sheets-Sheet 2

INVENTOR.
John B. Parsons
BY
*Malcolm W. Fraser*
ATTORNEY

Aug. 12, 1947.  J. B. PARSONS  2,425,391
HYDRAULIC REGULATOR MECHANISM FOR VEHICLE WINDOWS OR THE LIKE
Filed July 3, 1944  3 Sheets-Sheet 3

INVENTOR.
John B. Parsons
BY
ATTORNEY

Patented Aug. 12, 1947

2,425,391

UNITED STATES PATENT OFFICE 2,425,391

HYDRAULIC REGULATOR MECHANISM FOR VEHICLE WINDOWS OR THE LIKE

John B. Parsons, Toledo, Ohio

Application July 3, 1944, Serial No. 543,363

1 Claim. (Cl. 268—20)

This invention relates to regulator mechanism particularly for use on vehicles such, for example, as automobiles, to effect movement of a member between two stations or points of adjustment such as window glass, seat adjusters and the like.

An object is to produce regulator mechanism of the above character wherein several members are employed and in which the actuation of individual members is separately controlled but in which a master control enables simultaneous actuation of all members.

Another object is to produce new and improved regulator mechanism including a fluid motor for effecting movement of the member in one direction and separate means for effecting movement in the opposite direction, and in which there are a plurality of members employed, control means individual to each fluid motor being provided whereby the same may be controlled to effect movement of the member in one direction or the other, and wherein a master control means common to all of the fluid motors enables movement of all members in one direction or the other to be effected according to the manipulation of the master control.

A further object is to produce regulator mechanism for actuating members of a vehicle body such, for example, as vehicle windows which are movable between two stations or points of adjustment, the regulator mechanism including for each of the members, a fluid motor for effecting movement in one direction and separate means for effecting movement in the opposite direction, a control individual for each member being provided to enable selective actuation of the members and a master control common to all members being provided for effecting actuation thereof in one direction or the other, as desired.

A still further object is to produce a regulator mechanism for members such as vehicle windows movable between two stations, the regulator mechanism including power means for effecting movement thereof, and controls for individual members to effect operation thereof at will, master control means being provided for simultaneously actuating all of said members.

A still further object is to produce a new and improved switch mechanism particularly adapted for use in connection with the above regulator mechanism.

A still further object is to produce a new and improved fastener for securing telescoping members together and also to provide a snap means for mounting the telescoping members within an aperture of a supporting panel.

Other objects and advantages will hereinafter appear and for purposes of illustration but not of limitation, an embodiment of the invention is shown in the accompanying drawings in which Figure 1 is a front perspective view of an automobile of the closed body type, parts being broken away to show a hydraulic window regulator mechanism for two of the doors, and the motor driven pump unit;

Figure 1:
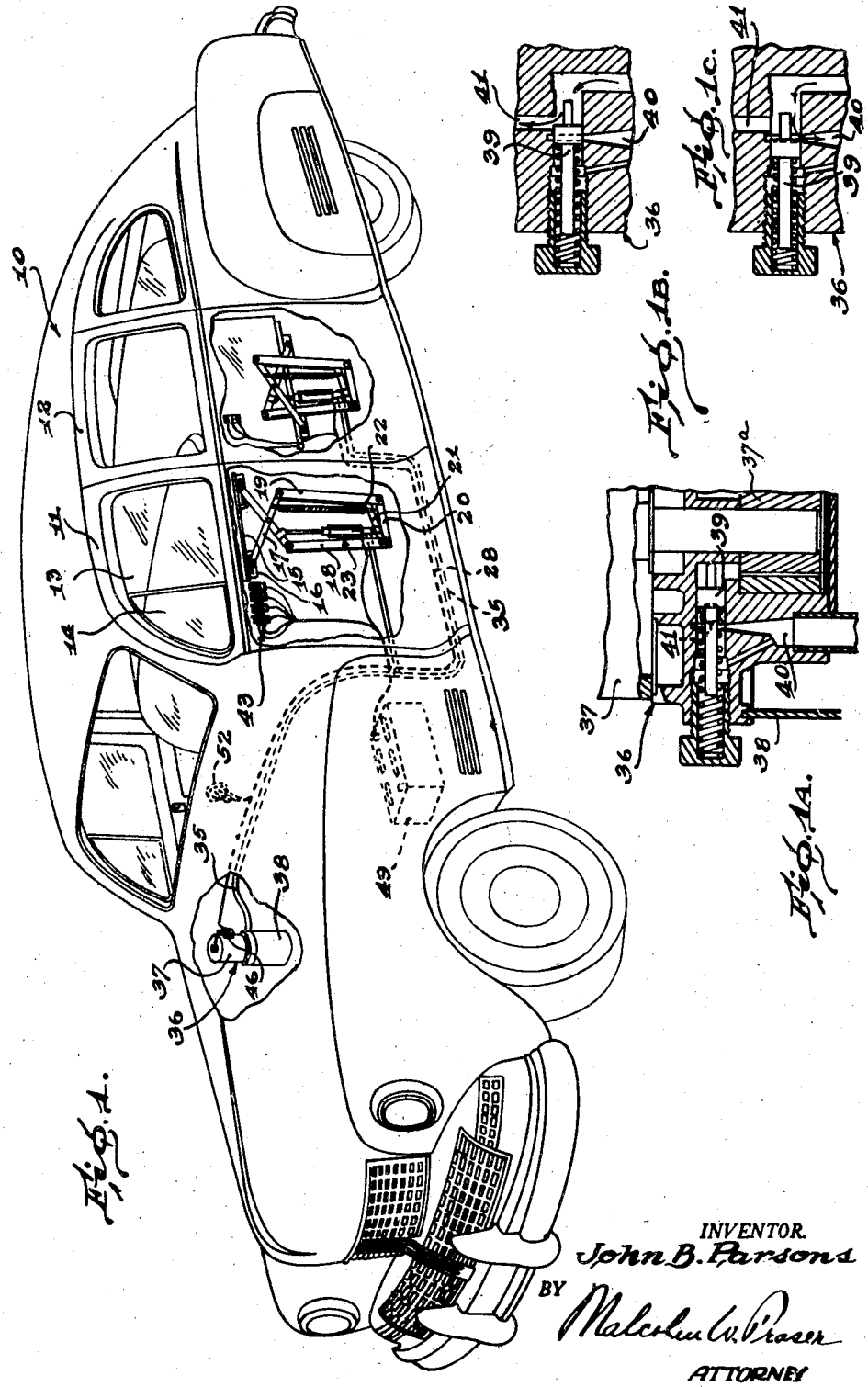
Figure 1a is a diagrammatic sectional view showing the pressure release valve associated with the pump and in position assumed when the pump is idle.
Figure 1b is a diagrammatic view similar to Figure 1a showing the position of the valve when the pump is operating.
Figure 1c is a diagrammatic view similar to Figure 1a showing the position of the valve when the pressure in the discharge line from the pump exceeds a predetermined maximum.

The illustrated embodiment of the invention comprises a closed automobile body 10 having side doors 11 and 12 arranged respectively on opposite sides of the body in the region of the front and rear seats. It will be understood that window regulator mechanism is mounted in each of the doors for actuating the respective window panels, but description will be directed only to those doors on the one side of the body, it being understood that similar mechanism is employed in the doors on the opposite side of the body.

Each front door is provided with the usual window opening to accommodate a vertically slidable window glass or panel 13 and in advance thereof is mounted the usual adjustable ventilating wing or panel 14. Fixed to the bottom edge of the window panel 13 is a channel strip 15 from which depends a pair of spaced retainers 16, each having a horizontally elongate guide slot. Slidable in the slots of the retainers 16 are buttons or studs mounted on the free ends of cross arms 17. The arms 17 are pivotally connected intermediate their ends and the opposite ends of these cross arms are pivoted respectively to the upper ends of upright stanchions or frame bars 18 and 19 respectively. The lower ends of the stanchions 18 and 19 are secured respectively to opposite ends of a cross bar 20. The stanchion 18 is rigidly secured to the cross bar 20 but the stanchion 19 is pivoted to the cross bar 20 in order that it may have rocking movements toward and away from the stanchion 18.

Pivoted at one end to the lower end portion of the stanchion 18 is an arm 21 which extends toward the arm 19 and hooked over the outer end portion of the arm 21 is a helical contractile spring 22 which has its opposite end hooked over the lower end portion of one of the cross arms 17 between the pivotal connection of the cross arms and the adjacent stanchion. Connected to the arm 21 between its pivotal mounting and the coil spring 22 is a fluid motor 23, which includes a piston rod connected to the other of the cross arms 17 between the pivotal connection thereof and the adjacent stanchion. It will be understood that the opposite ends of the fluid motor 23 are connected to the pivoted mounting arm 21 and the respective cross arm in order to have rocking movements relative thereto. Reference is hereby made to my copending application Serial No. 519,617, which shows and describes more fully the above regulator structure.

Figure 2:
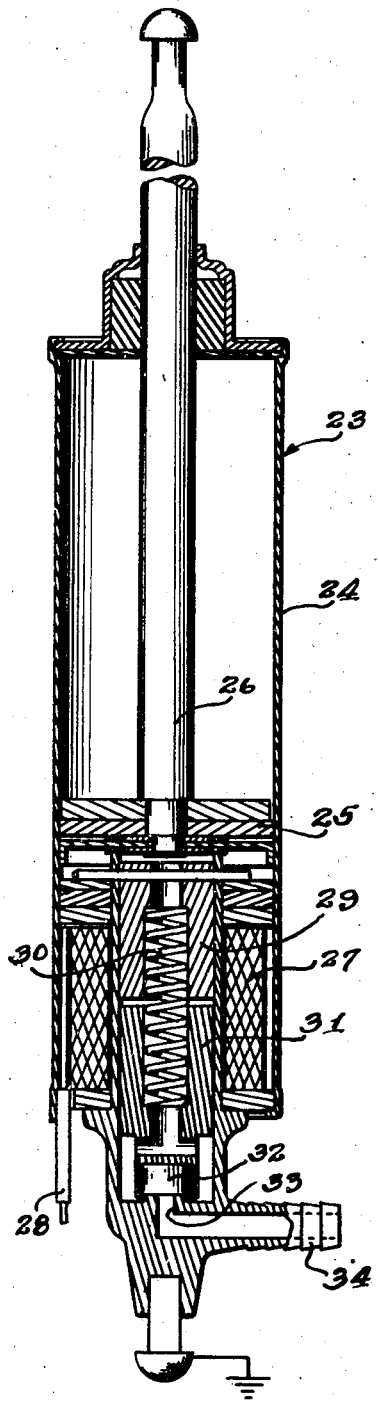
Figure 2 is an enlarged vertical sectional elevation of one of the hydraulic piston and cylinder assemblies used in connection with the window regulator mechanism.

As shown in Figure 2, the fluid motor 23 includes a cylinder 24 in which a piston 25 is reciprocable, the piston 25 having a piston rod 26. Within the lower end of the cylinder 24 beneath the piston 25 is a solenoid 27 from which extends a lead 28. Disposed concentrically within the solenoid 27 is a stationary tubular member 29, which provides a seat for one end of a coil spring 30, the opposite end of which bears against a tubular valve member 31 formed with a rubber sealing nose 32 to close the passage 33 leading from an attaching nipple 34. The valve member 31 is so formed that when the solenoid 27 is energized and the valve member is moved upwardly compressing the spring 30, fluid, such as liquid, may pass into the cylinder above the solenoid or therefrom through the passages above described. Lateral ports are formed in the valve member above the sealing nose 32 to enable the flow of fluid when the nose is moved away from its seat.

From the above description it will be understood that in order to effect movement of the window glass in one direction or toward its closed position, the solenoid 27 is energized to unseat the valve and, as will hereinafter appear, liquid is forced into the cylinder to force the piston 25 upwardly or in a direction away from the solenoid. During such movement, it will be manifest that the coil spring 22 is placed under tension. When the solenoid 27 is deenergized and the source of liquid under pressure is rendered ineffective, the valve moves abruptly to its seat under the influence of the spring 30 and liquid trapped within the cylinder prevents retrograde movement of the piston. However, by again energizing the solenoid 27 without rendering effective the source of liquid under pressure, the coil spring 22 causes opposite or downward movement of the window glass and at the same time causes the piston 25 to move downwardly and expel liquid from the cylinder through the same ports and passages previously used to admit liquid under pressure to the cylinder.

Figure 3:
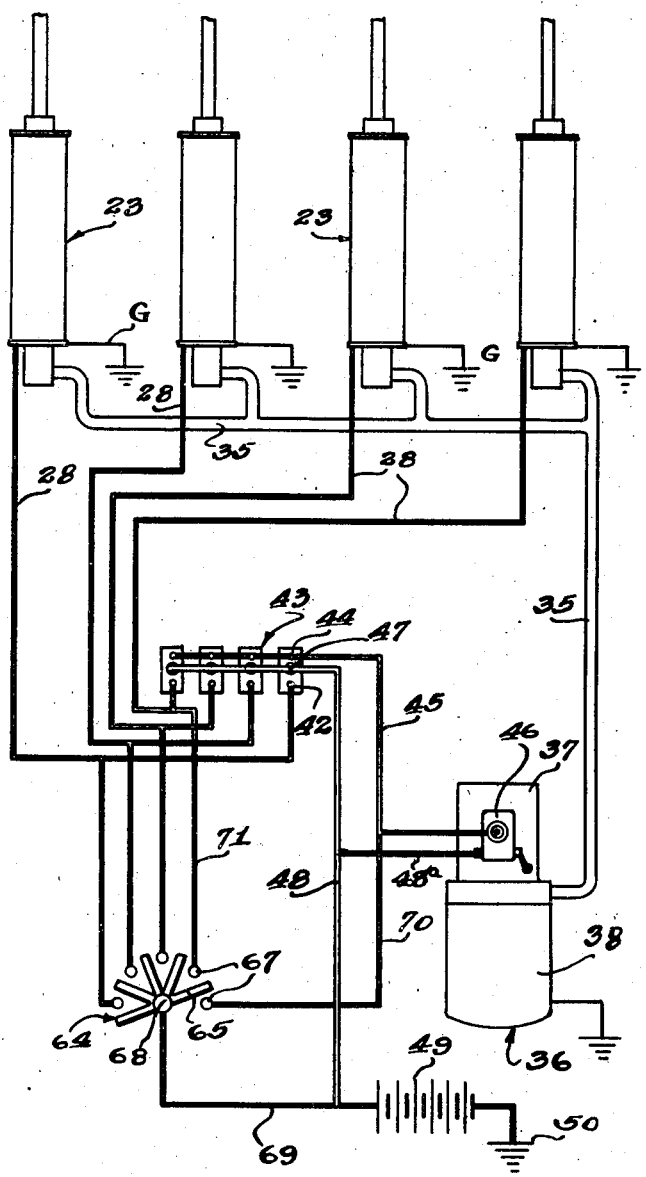
Figure 3 is a wiring diagram showing the controls for the individual solenoid associated with the piston and cylinder assemblies respectively and the motor operating pump and also showing the master control whereby all windows may be simultaneously actuated.

Connected to the nipple 34 is a tube 35, which extends to a motor pump unit 36 (Figure 1). The unit 36 includes an electric motor 37 which is connected to operate a pump 37a for drawing liquid from a suitable reservoir 38 which forms a part of the unit 36, and force same under pressure through the tube 35 to selected fluid motors 23. As indicated in Figure 3, the tube 35 has branches which connect to each of the fluid motors. The same tube 35 serves to drain liquid from the fluid motors back to the reservoir 38. Any suitable pump driven directly by the electric motor 37 may be employed for the purpose but one satisfactory form of pump consists of two rotors arranged one within the other, each having teeth of a particular design, the same being available on the market under the trade-name of "Gerotor."

Interposed between the electric motor driven pump 37a and the tube 35 is a valve illustrated in Figures 1a, 1b and 1c. As shown in those figures, a spring tensioned valve 39 in its normal position enables liquid from the tube 35 to flow past or about its rear face portion and into a passage 40, which leads to the reservoir 38. When the pump is in operation, the pressure so created moves the spring tensioned valve 39 to the left as shown in Figure 1b to enable the pump to force liquid under pressure through the discharge passage 41 which, it will be understood, is in direct communication with the tube 35. In the event that a resistance in excess of a predetermined maximum, or an obstruction is encountered by one of the fluid motors 23 or associated structure, the spring tensioned valve 39 may then move further to the left or away from the pump substantially to the position shown in Figure 1c, so that the liquid forced by the pump may then return to the reservoir 38 through the drain passage 40, thereby avoiding damage to the parts.

As shown on Figure 3, each of the solenoids 27 is grounded, as indicated at G, and the lead 28 from each solenoid extends to a binding post 42 on one of the switches 43, there being one switch for each fluid motor. Four fluid motors are shown on Figure 3, one for a window glass in each of the four doors. Another binding post 44 on each switch is connected by a lead 45 to a relay switch 46, which is electrically connected to the motor 37. A binding post 47 is interposed on the switch 43 between the binding posts 42 and 44, and this binding post is connected by a lead 48 to a suitable storage battery 49, which is grounded at 50. A branch lead 48a extends from the battery lead 48 to the relay 46.

By means of any suitable manually operated switch member, the binding posts 42 and 47 may be connected, thereby to energize the solenoid 27. The switch member is also operable electrically to connect both the binding posts 42 and 44 with the central live binding post 47, thereby to energize the electric motor 37 through the relay 46 as well as the solenoid 27. Any suitable switch mechanism may be employed in this connection, but reference is hereby made to my Patent No. 2,344,452, dated March 14, 1944, which shows one form of switch mechanism which has proved satisfactory in this connection.

An important feature of this invention resides in the provision of a master control by which all of the regulator mechanism units may be simultaneously operated either to effect opening or closing of the window glass panels. Thus when a person is about to leave his car, such control may be actuated for readily and conveniently closing all of the window panels. Such device is also useful during hot weather such, for example, as where the automobile has stood in the sunlight for such period that the inside of the body is extremely warm. By actuating the master control, all of the windows may be quickly opened without the necessity of manipulating individual regulators.

Figure 4:
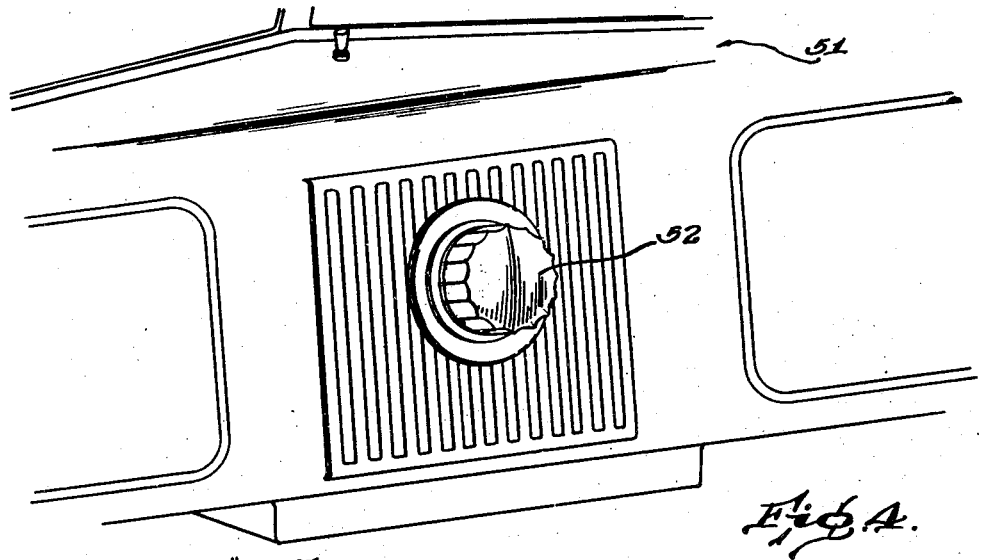
Figure 4 is a fragmentary view of the instrument panel for the automobile showing the mounting of the master switch control knob.
Figure 5:
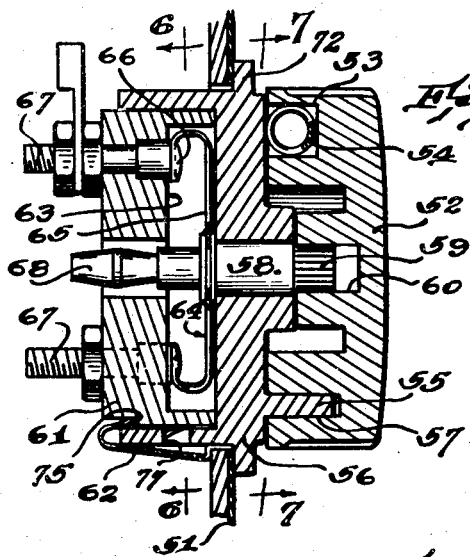
Figure 5 is an enlarged vertical sectional elevation of the master control switch.
Figure 6:
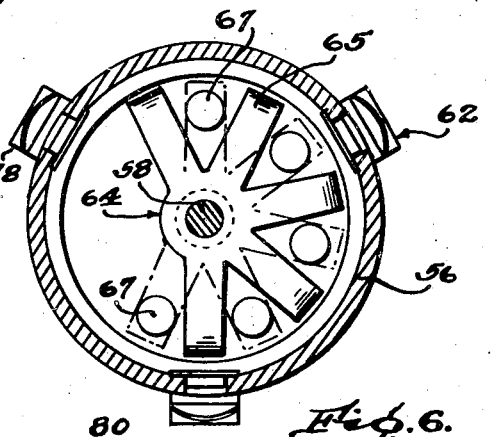
Figure 6 is a transverse sectional view substantially on the line 6—6 of Figure 5.
Figure 7:
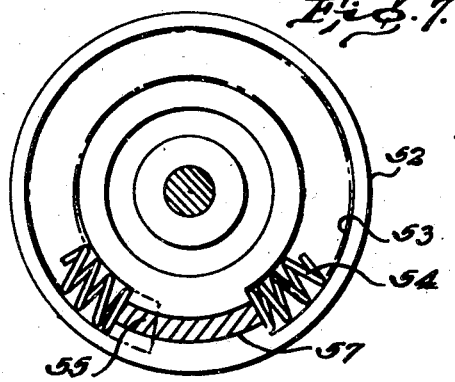
Figure 7 is a transverse sectional view on the line 7—7 of Figure 5.
Figure 8:
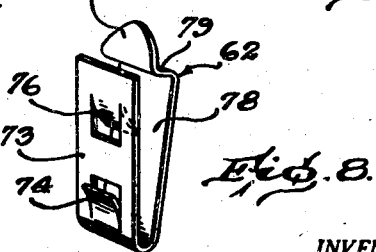
Figure 8 is a perspective view of the clip employed in mounting of the switch asembly within the aperture provided in the instrument panel.

As shown in Figure 4, 51 indicates the automobile instrument panel in front of the driver's seat and in this instance and as a matter of convenience, a master control knob 52 is mounted on the instrument panel centrally thereof so as to be readily accessible to the driver. As will hereinafter appear, by turning the master control knob 52 in one direction, all of the windows in the body are moved to closed position by the regulator mechanisms above described and by turning the knob 52 in the opposite direction, all of the windows are simultaneously moved to open position.

The master control knob 52 may be of molded plastic and is formed on its under side with an arcuate groove 53, which extends nearly around the knob body. Arranged within the groove 53 is an helical coil spring 54, the ends of which abut against an arcuate post or vane 55, which is integral with a stationary cup member 56. An arcuate groove 57 is formed in the under side of the knob 52 to receive the arcuate post 55. It will be manifest that the knob 52 will at all times return to a predetermined central position after it is turned either in one direction or the other. Rotatable in the central portion of the cup 56 is a shaft 58, which has a knurled head 59 fitting snugly into a socket 60 formed in the under side of the knob 52 so that turning movement of the knob 52 imparts corresponding turning movement to the shaft 58.

The cup 56 may also be of molded plastic or other suitable insulating material, and fitting within this cup is another cup member 61, which is secured to the cup member 56 by a sheet metal spring fastener 62. Arranged within a cavity 63 formed between the cup members 56 and 61 is a switch member 64, provided with a series of radially extending metallic switch arms 65, the end portions of which are bent downwardly and inwardly into parallel relation to provide spring contact fingers 66. The switch member 64 is suitably secured to the shaft 58 for rotation therewith. Fixed to the cup member 61 is an arcuate row of binding posts 67, the inner ends of which are disposed within the cavity 63 and are engageable by one or another of the contact fingers 66 during the turning movement of the control knob 52.

Extending through a central opening in the cup 61 is a suitable binding post 68, which is connected by a lead 69 to the battery 49, as shown on Figure 3. One of the binding posts 67 is connected by a lead 70 to the relay 46 of the pump operating motor 37. The other binding posts 67 are connected respectively by leads 71 to the leads 28 which extend to the individual solenoids 27. As shown in Figure 3, there are five spring contact arms 65 and five binding posts 67. By turning the control knob 52 to move the switch member 64 to the right of Figure 3, current is supplied from the battery 49 through the lead 69 to energize the electric motor through the lead 70 and the solenoids of all the fluid motors through the leads 71. From the above description, it will be understood that in this manner all of the windows are moved to closed position by introducing liquid under pressure into each of the fluid motors to actuate the individual pistons upwardly.

However, upon turning the knob in the opposite direction to move the switch unit 64 to the left of Figure 3 or in a direction away from the binding post to which the motor energizing lead 70 is connected, current from the battery 49 will pass through the lead 69 and through the actuating arm 65 to each of the binding posts 67 to which the leads 71 are connected. Consequently movement of the control knob in this direction energizes the solenoids 27 of each of the fluid motors for unseating the associated valves and, as above explained, enable the coil springs 22 to move the window panels downwardly toward open position as long as the operator holds the control knob 52 in that position. As soon as the operator releases the control knob 52, the coil spring 54 returns the same to its normal inoperative position or in the position shown in Figure 3.

The cup member 56 which forms a part of the master control switch fits into an aperture formed in the instrument panel 51, an annular flange 72 providing an escutcheon. The fastener 62 is in the form of a substantially V-shaped clip and has a leg portion 73, which is inserted between the outer wall of the cup member 61 and the inner wall of the skirt portion of the cup 56. Struck outwardly from the lower portion of the leg portion 73 is a resilient tongue 74, which is adapted to abut against a shoulder 75 formed on the outer wall of the cup member 61. It will be observed that the tongue 74 inclines in a direction toward the inner end of the cup member 61. Adjacent the upper end of the leg 73 is a resilient tongue 76, which extends from the opposite side of the leg to engage an edge of an aperture 77 formed in the skirt portion of the cup member 56. Thus due to the cooperative action of the tongues 74 and 76, the cup members 56 and 61 are held in assembled relation and in order to separate them, a suitable tool must be inserted into the aperture 77 to depress the tongue 76 and thereupon the cup parts may be separated.

The clip member 62 is formed with an integral arm 78, which is substantially parallel to the arm 73 and is formed near its upper end with a bent portion forming a shoulder 79, to bear against the inner edge portion of the instrument panel adjacent the switch receiving opening thereof. On the outer end portion of the leg 78 is an integral tab or flange 80, which is bent over to engage the outer side of the instrument panel and is arranged between the instrument panel and the escutcheon flange 72.

From the above description, it will be understood that the master control switch may be mounted as a unit within a suitable opening formed in the instrument panel 51. In this instance, three fasteners 62 are employed for retaining the parts in place. It will be understood that after the clips 62 are attached to the cup portions 61 and 56 of the switch, the entire assembly may then be forced as a unit into the instrument panel opening and due to the snap action of the fastener arm 78, the parts are securely fastened in the desired position.

It is to be understood that numerous changes in details of construction, arrangement and operation may be effected without departing from the spirit of the invention especially as defined in the appended claim.

What I claim is:

In a vehicle body, a plurality of window glasses mounted for movement between open and closed positions, a regulator mechanism associated with each window glass for effecting such movement, each mechanism comprising a fluid motor for effecting window closing movement, said motor including a cylinder and piston, an operative connection between said piston and the opposite edge portion of the window glass, an electromagnetically controlled normally closed valve controlling the passage of fluid to and from said cylinder, a pump for supplying fluid under pressure to said cylinder, an electric motor for operating said pump, a fluid reservoir communicating with said pump, a contractile spring anchored at one end, means providing an operative connection between said spring and said window glass for tensioning the spring during movement of the window glass in one direction, thereby to enable the spring to move the window glass in the opposite direction, a switch individual to each regulator mechanism having one contact electrically connected to the respective electromagnetic valve, another contact electrically connected to said electric motor, and an armature electrically connected to a source of electricity for concomitantly operating such electromagnetic valve and said electric motor when disposed in one position or for operating only such electromagnetic valve when in another position, and another switch separate from the first-named switches and having a plurality of separate contacts electrically connected to said electromagnetic valves respectively, another contact electrically connected to said electric motor, and an armature electrically connected to said source of electricity for energizing all of said electromagnetic valves and the electric motor when in one position or for energizing all of said electromagnetic valves only when in another position, thereby to cause movement of all of the window glasses simultaneously either toward open or closed position.

JOHN B. PARSONS.

REFERENCES CITED

The following references are of record in the file of this patent:

UNITED STATES PATENTS

| Number | Name | Date |
|---|---|---|
| 389,297 | Griscom | Sept. 11, 1888 |
| 1,570,304 | Hynes | Jan. 19, 1926 |
| 1,076,051 | Morgan | Oct. 21, 1913 |
| 2,061,530 | Wile | Nov. 17, 1936 |
| 2,145,533 | Starr | Jan. 31, 1939 |
| 2,298,542 | Potter et al. | Oct. 13, 1943 |
| 2,311,864 | Parsons | Feb. 23, 1943 |
| 2,301,576 | Parsons et al. | Nov. 10, 1942 |
| 2,058,530 | Thomas | Oct. 27, 1936 |
| 1,911,911 | Marsh | May 30, 1933 |
| 1,731,254 | McNab | Oct. 15, 1929 |
| 1,975,278 | Lebel | Oct. 2, 1934 |
| 2,093,201 | Love | Sept. 14, 1937 |
| 2,190,295 | Miller et al. | Feb. 13, 1940 |